(12) United States Patent
Takenaka et al.

(10) Patent No.: US 7,012,112 B2
(45) Date of Patent: Mar. 14, 2006

(54) THERMOPLASTIC RESIN COMPOSITION FOR ELECTRICAL/ELECTRONIC CONTACT PART AND ELECTRICAL/ELECTRONIC CONTACT PART USING THE SAME

(75) Inventors: Yutaka Takenaka, Kyoto (JP); Kenji Funaki, Shiga (JP); Toshiyuki Furuya, Kanagawa (JP); Shigeru Muramatsu, Kanagawa (JP); Yoshitaka Kanazawa, Kanagawa (JP); Osamu Kimura, Kanagawa (JP)

(73) Assignees: Omron Corporation, Kyoto (JP); Mitsubishi Engineering Plastics Corporation, Tokyo (JP)

( * ) Notice: Subject to any disclaimer, the term of this patent is extended or adjusted under 35 U.S.C. 154(b) by 281 days.

(21) Appl. No.: 10/406,219

(22) Filed: Apr. 4, 2003

(65) Prior Publication Data

US 2003/0207973 A1   Nov. 6, 2003

Related U.S. Application Data

(62) Division of application No. 08/579,906, filed on Dec. 28, 1995, now abandoned.

(30) Foreign Application Priority Data

| Dec. 28, 1994 | (JP) | .................................. 6-340217 |
| Feb. 3, 1995 | (JP) | .................................. 7-039077 |

(51) Int. Cl.
*C08K 3/22*         (2006.01)

(52) U.S. Cl. ...................... 524/412; 524/377; 524/386; 524/387; 524/411; 524/464; 524/465; 524/469

(58) Field of Classification Search ........ 524/411–412, 524/464–471, 377, 386–387
See application file for complete search history.

(56) References Cited

U.S. PATENT DOCUMENTS

| 4,242,398 A | | 12/1980 | Segawa et al. |
| 5,258,434 A | * | 11/1993 | Hanabusa .................... 524/310 |
| 5,338,795 A | | 8/1994 | Fukumoto et al. |

FOREIGN PATENT DOCUMENTS

| DE | 25 45 568 | 4/1976 |
| EP | 0 069 297 | 1/1983 |
| EP | 0 466 481 | 1/1992 |
| EP | 0 516 351 | 12/1992 |
| JP | 62-195090 | 8/1987 |
| JP | JP 63-5434 | 2/1988 |
| JP | 4-351657 | 12/1992 |
| JP | 6-9858 | 1/1994 |
| JP | 6-157881 | 6/1994 |
| JP | 6-263973 | 9/1994 |
| JP | 6-279659 | 10/1994 |
| JP | 6-322244 | 11/1994 |
| JP | 7-41651 | 2/1995 |
| JP | 7-76694 | 3/1995 |
| JP | 7-141951 | 6/1995 |
| JP | 2001-254009 | * 9/2001 |

OTHER PUBLICATIONS

Takenaka, Yutaka et al., "Development of Low Gas Emission PBT", Proceedings of the 17th International Conference on Electrical Contacts, Jul. 5, 1994, pp. 521-527.

Takenaka, Yutaka et al., "Effects of Organic Gas Components on Contact Resistance", Proceedings of the 41st IEEE Holm Conference on Electrical Contacts: Electrical Contacts: Electrical Contacts, Oct. 3, 1995, pp. 260-266.

Shimada, Shingo et al., "Effects of Various Organic Vapors on Contact Resistance", Proceedings of the 17th International Conference on Electrical Contacts, Jul. 5, 1994, pp. 159, 166.

* cited by examiner

*Primary Examiner*—Peter Szekely
(74) *Attorney, Agent, or Firm*—Morrison & Foerster LLP

(57) ABSTRACT

A thermoplastic resin composition for an electrical/electronic contact part according to the present invention includes a thermoplastic resin and a polyol, wherein the polyol is contained in a range of 0.2 to 10 parts by weight based on 100 parts by weight of the thermoplastic resin. Alternatively, a thermoplastic resin composition for an electrical/electronic contact part according to the present invention includes: a thermoplastic resin; a halogenated aromatic compound which is contained in a range of 1 to 50 parts by weight based on 100 parts by weight of the thermoplastic resin; and a double salt represented by at least one of $(X_2O)_n \cdot Sb_2O_5$ and $(YO)_n \cdot Sb_2O_5$, where X represents a monovalent alkaline metal element, and Y represents a divalent alkaline earth metal element, and n represents a ratio of $X_2O$ or YO to $Sb_2O_5$ exceeding 0.7, the double salt having an adsorbed water elimination rate of not more than 50 min. as calculated in terms of titration time; or a polyol; wherein the double salt is contained in a range of 0.5 to 40 parts by weight based on 100 parts by weight of the thermoplastic resin.

8 Claims, 17 Drawing Sheets

|  | BROMINE GAS | | ϑ-BUTYRO-LACTONE | DRY CORROSION TEST | | | RETARDANCE (1/32 INCH) |
|---|---|---|---|---|---|---|---|
|  | 260°C | 300°C |  | 72h | 144h | 240h |  |
| EXAMPLE 1 | 3 ppm | 330 ppm | N.D. | ◎ | ◎ | ○ | V-0 |
| COMPARATIVE EXAMPLE 1 | 96 ppm | 1390 ppm | N.D. | ○ | × | × | V-0 |
| COMPARATIVE EXAMPLE | 9 ppm | 330 ppm | 0.2 ppm | ◎ | ◎ | ○ | V-0 |

FIG. 7

|  | RETARDANCE (1/32 INCH) | 1,4-BUTYLENE GLYCOL | OTHER POLYOLS |
| --- | --- | --- | --- |
| EXAMPLE 1 | V-0 | 0.6 ppm | 4.3 ppm |
| COMPARATIVE EXAMPLE 3 | V-0 | 0.4 ppm | N.D. |
| COMPARATIVE EXAMPLE 4 | V-0 | 0.1 ppm | N.D. |

FIG. 8A

|  | 0V | 10V - 10mV | 28V - 100mV |
|---|---|---|---|
| EXAMPLE 1 | 0% | 0% | 0% |
| COMPARATIVE EXAMPLE 3 | 0% | 5% | 0% |
| COMPARATIVE EXAMPLE 4 | 66% | 15% | 13% |
| BLANK | 100% | 100% | 100% |

FIG. 8B

ELECTRICAL LIFE CHARACTERISTICS IN THE
PRESENCE OF 1.4-BUTANEDIOL

|  | NUMBER OF RELAY | NUMBER OF STICKING | | | | ACCEPTANCE |
| --- | --- | --- | --- | --- | --- | --- |
|  |  | 1a | 2a | 1b | 2b |  |
| EXAMPLE 1 | 1 | 0 | 0 | 0 | 0 | 20/20 |
|  | 2 | 0 | 0 | 0 | 0 |  |
|  | 3 | 0 | 0 | 0 | 0 |  |
|  | 4 | 0 | 0 | 0 | 0 |  |
|  | 5 | 0 | 0 | 0 | 0 |  |
| COMPARATIVE EXAMPLE 3 | 1 | 55 | 4 | 99 | 99 | 1/20 |
|  | 2 | 25 | 35 | 99 | 99 |  |
|  | 3 | 99 | 99 | 99 | 99 |  |
|  | 4 | 13 | 14 | 99 | 99 |  |
|  | 5 | 12 | 0 | 99 | 99 |  |
| COMPARATIVE EXAMPLE 4 | 1 | 99 | 99 | 99 | 99 | 0/20 |
|  | 2 | 99 | 99 | 99 | 99 |  |
|  | 3 | 99 | 99 | 99 | 99 |  |
|  | 4 | 99 | 99 | 99 | 99 |  |
|  | 5 | 99 | 99 | 99 | 99 |  |

FIG. 16

THERMOPLASTIC RESIN COMPOSITION FOR ELECTRICAL/ELECTRONIC CONTACT PART AND ELECTRICAL/ELECTRONIC CONTACT PART USING THE SAME

BACKGROUND OF THE INVENTION

1. Field of the Invention

The present invention relates to a thermoplastic resin composition for molding a resin molding structure member included in electrical/electronic contact parts having a electrical contact such as a switch and a relay, and the electrical/electronic contact parts using the resin molding structure member using the thermoplastic resin composition.

2. Description of the Related Art

In general, an electrical/electronic contact parts such as switch and relay is required to exhibit a high fire retardance. At the same time, an electrical/electronic contact parts are required to comprise a minute and complicated resin-molded structure as one of constituent elements to attain miniaturization and weight reduction at which they are always aiming. Further, electrical/electronic contact parts are required to exhibit a prolonged electrical and mechanical life as well as prevent sticking (general term for fusion, locking and sticking between contacts).

As a resin molding material meeting these requirements, there has been normally used a thermoplastic resin composition obtained by blending a thermoplastic resin called so-called engineering plastics with various additives. For example, the engineering plastics is polyester resin, polyamide resin or polycarbonate resin having excellent mechanical and electrical characteristics. For example, various additives is organic halogen or phosphoric fire retardant (e.g., epoxy resin containing brominated bisphenol compound, pentabromobenzyl polyacrylate (PBBPA) and brominated polycarbonate oligomer).

However, if the conventional thermoplastic resin composition blended with various additives is used as a molding material for resin-molded structure constituting electrical/electronic contact parts such as relay and switch, an organic gas produced by the thermal decomposition of the resin or additives during and/or after the molding of the resin-molded structure undergoes mechanochemical reaction with the surface of a metal (e.g., Ag) at the electrical contact to produce a brown powder or reacts with the surface of the contact via arc to produce a black powder, thereby raising the contact resistance and hence causing contact failure. Thus, these problems are greatly disadvantageous to electrical/electronic contact parts essentially having requirements for high reliability. Further, the organic gas thus produced can undergo direct reaction with a mold heated to elevated temperatures to corrode the mold.

Among electrical/electronic contact parts, sealed electrical/electronic contact parts such as a relay and seal switch for a communication apparatus which have been sealed with a resin material for smaller size or enhanced reliability are remarkably disadvantageous in that an organic gas produced from the resin-molded structure cannot go out and stays in its inside to react with the electrical contact, junction or connection, thereby giving a rise in the contact resistance to cause contact failure.

In an attempt to solve problems such as contact failure caused by the generation of organic gas, it has been a common practice to use as a constituent element of electrical/electronic contact parts that a resin-molded structure which has been degassed by vacuum baking to eliminate the effect of the organic gas component produced from the resin-molded structure on the electrical contact.

However, the degassing by vacuum baking is disadvantageous in that it not only gives a reduced productivity that adds to the production cost but also impairs the gloss of the molded structure. Further, the resulting molded structure exhibits a reduced toughness and hence a high brittleness and thus can easily release a molding powder that stains the electrical contact to cause contact failure. Moreover, if the resin-molded structure is excessively degassed, sticking can occur. In an attempt to inhibit sticking, some approaches have been proposed, e.g., a method which comprises the application of a lubricant to the surface of electrical contact or sliding portion on electrical/electronic contact parts comprising a molded structure prepared by a molding process involving degassing by vacuum baking (as disclosed in Examined Japanese Patent Publication (kokoku) No. Sho. 63-5434, and a method which comprises the incorporation of a felt impregnated with a lubricant in electrical/electronic contact parts (as disclosed in Examined Japanese Patent Publication (kokoku) No. Sho. 62-195090). However, these approaches are disadvantageous in that they have to have additional steps and parts required for the preparation of electrical and electronic parts.

On the contrary, if the resin-molded structure is insufficiently degassed by vacuum baking, the remaining organic gas inevitably causes contact failure. Accordingly, in order to cause neither contact failure nor sticking when the conventional thermoplastic resin composition is used as a molding material, it is necessary that the baking degassing condition is optimized depending on the purpose of the molded structure. However, this countermeasure requires much time and labor and thus can be hardly conducted.

On the other hand, a resin composition which has a reduced volatile content to reduce the vacuum baking time is proposed in Unexamined Japanese Patent Publication (kokai) Nos. Hei. 6-9858 and Hei. 6-157881 taking into account a concept that the generation of the organic gas is mainly attributed to volatile content.

In other words, Unexamined Japanese Patent Publication No. Hei. 6-9858 proposes the use of a polybutylene terephthalate having a low terminal hydroxyl group concentration to minimize the generation of tetrahydrofuran (THF) on the basis of an assumption that the gas produced by the decomposition of the molded structure during molding or use comprises THF as a main component. Unexamined Japanese Patent Publication No. Hei. 6-167881 proposes the extension of the period of drying of the resin composition before molding to minimize the generation of volatile component. However, even these proposals can prevent neither the generation of contact failure nor the generation of sticking.

Further, the combined use of a halogenic fire retardant and an auxiliary fire retardant such as antimony oxide compound has been proposed as an approach for solving problems such as contact failure caused by the production of halogen gas instead of degassing treatment by vacuum baking. One example of the foregoing proposal is the use of antimony trioxide ($Sb_2O_3$) as an auxiliary fire retardant. Another example is the use of a double salt of antimony pentaoxide ($Sb_2O_5$) with an oxide of alkaline metal such as sodium oxide as proposed in Unexamined Japanese Patent Publication (kokai) No. 4-351657.

When such a double salt of antimony trioxide ($Sb_2O_3$) or antimony pentaoxide ($Sb_2O_5$) with an oxide of alkaline metal such as sodium oxide is used in combination with a halogenic fire retardant as an auxiliary fire retardant, the desired fire retardance can be given with a reduced total content of the fire retardant while reducing the produced amount of halogen gas as compared with the thermoplastic resin composition free of an auxiliary fire retardant even if no degassing by vacuum baking is effected.

However, the use of antimony trioxide ($Sb_2O_3$) as an auxiliary fire retardant is disadvantageous in that the absorption of halogen gas in the resulting thermoplastic resin composition is insufficient, thereby giving an insufficient effect of eliminating contact failure, and the electrical contact and the mold can be easily corroded as can be seen in the dry corrosion test described later. On the other hand, the combined use of a double salt of antimony pentaoxide ($Sb_2O_5$) with an oxide of alkaline metal, such as $(Na_2O)_{0.7} \cdot (Sb_2O_5)_{1.0}$ can provide an excellent absorption of halogen gas but is disadvantageous in that it gives a reduced adsorbed water elimination rate that reduces the melt stability and gives a great variation of melt viscosity with time, so that it is difficult to recycle products having stabilized properties. Further, this approach is disadvantageous in that γ-butyrolactone, which increases the contact resistance of the electrical contact, is produced. Thus, this approach leaves something to be desired in the elimination of contact failure.

SUMMARY OF THE INVENTION

It is an object of the present invention to provide a resin composition for electrical/electronic contact parts which has an extremely improved contact reliability and capable of efficiently producing products having a stable performance, and to provide an electrical/electronic contact part including a structure molded by the thermoplastic resin composition.

A thermoplastic resin composition for an electrical/electronic contact part according to the present invention includes a thermoplastic resin and a polyol, wherein the polyol is contained in a range of 0.2 to 10 parts by weight based on 100 parts by weight of the thermoplastic resin. Alternatively, a thermoplastic resin composition for an electrical/electronic contact part according to the present invention includes: a thermoplastic resin; a halogenated aromatic compound which is contained in a range of 1 to 50 parts by weight based on 100 parts by weight of the thermoplastic resin; and a double salt represented by at least one of $(X_2O)_n \cdot Sb_2O_5$ and $(YO)_n \cdot Sb_2O_5$, where X represents a monovalent alkaline metal element, and Y represents a divalent alkaline earth metal element, and n represents a ratio of $X_2O$ or $YO$ to $Sb_2O_5$ exceeding 0.7, the double salt having an adsorbed water elimination rate of not more than 50 min. as calculated in terms of titration time; or a polyol; wherein the double salt is contained in a range of 0.5 to 40 parts by weight based on 100 parts by weight of the thermoplastic resin.

According to the present invention, it can inhibit the rise in the contact resistance due to organic gas and hence eliminate the occurrence of contact failure without any degassing treatment by vacuum baking requiring much time and labor. It also can inhibit the loss of gloss caused by degassing and the occurrence of contact failure caused by the contamination with molding powder released with the loss of toughness. It can also eliminate the occurrence of sticking and hence remarkably enhance the reliability and electrical and mechanical life of the contacts in an electrical/electronic contact part. It can also enhance the metal corrosion resistance and hence prolong the life of the contacts as well as mold. It can stabilize the contact resistance, making it possible to provide a thermoplastic resin composition suitable for electrical or electronic contact parts having a contact which is opened and closed less frequently. It can widen the degree of freedom of selection of contact materials.

BRIEF DESCRIPTION OF THE DRAWINGS

In the accompanying drawings;

FIG. 7 is a table illustrating the results of various measurements of physical properties of Example 1 of the present invention and Comparative Examples 1 and 2;

FIG. 8A is a table illustrating the results of various measurements of physical properties of Example 1 and Comparative Examples 3 and 4;

FIG. 8B is a table illustrating the results of evaluation of the life of relays of Example 1 and Comparative Examples 3 and 4;

FIG. 16 is a table illustrating the data of sticking occurring with closed electromagnetic relays including as constituent elements structures molded by thermoplastic resin compositions of Example 1 and Comparative Examples 3 and 4;

DETAILED DESCRIPTION OF THE INVENTION

Figure 1:
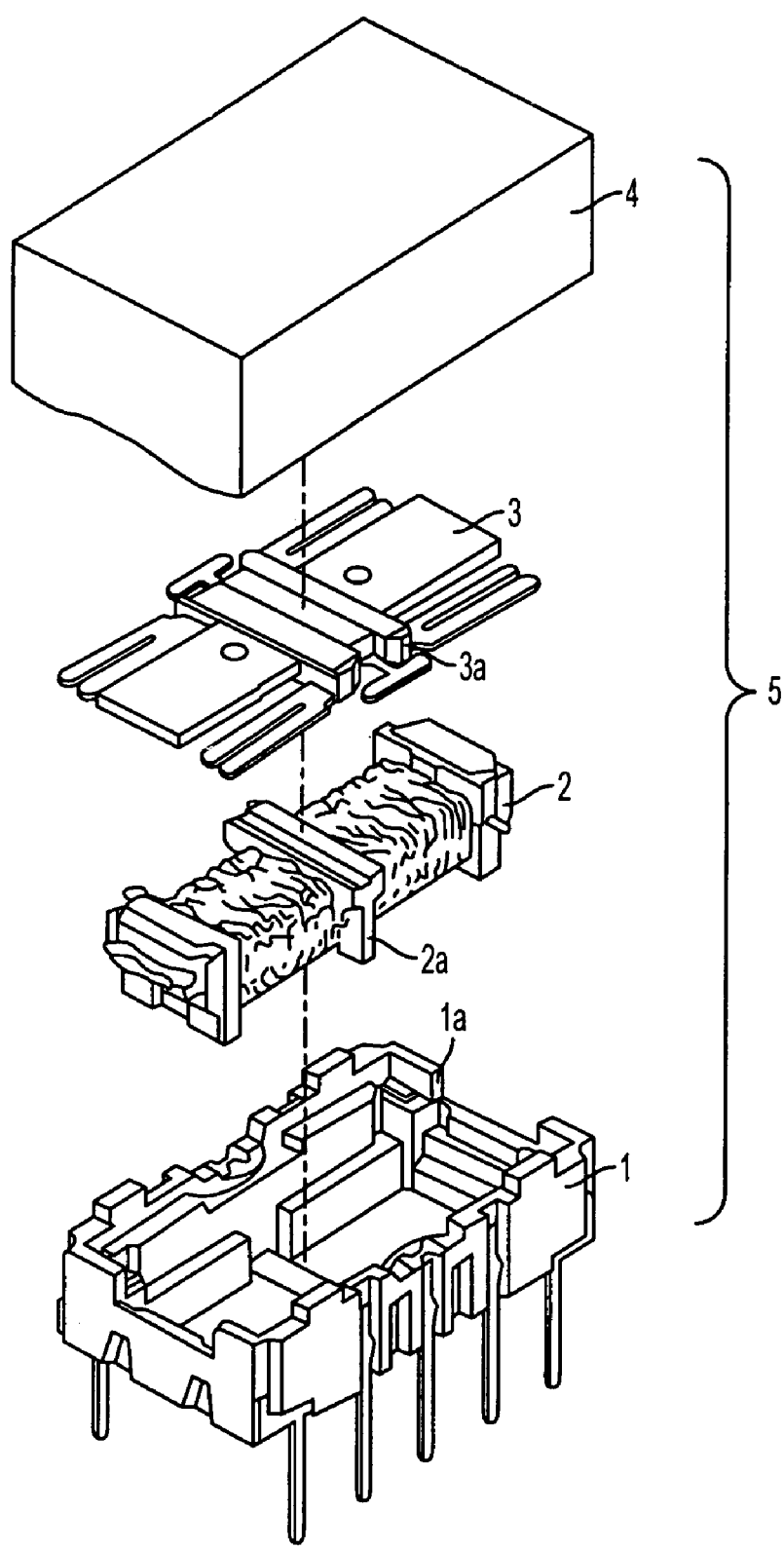
FIG. 1 is an exploded perspective view of an electromagnetic relay according to the present invention.

Detailed description of the present invention will be described referring to the accompanying drawings as follows.

In the present invention, a thermoplastic resin composition for an electrical/electronic contact part includes a polyol incorporated therein in an amount of from 0.2 to 10 parts by weight, preferably from 0.5 to 5 parts by weight based on 100 parts by weight thereof.

Alternatively, a thermoplastic resin composition for an electrical/electronic contact part according to the present invention includes a thermoplastic resin and a polyol, wherein the polyol is contained in a range of 0.2 to 10 parts by weight based on 100 parts by weight of the thermoplastic resin. Alternatively, a thermoplastic resin composition for an electrical/electronic contact part according to the present invention includes: a thermoplastic resin; a halogenated aromatic compound which is contained in a range of 1 to 50 parts by weight based on 100 parts by weight of the thermoplastic resin; and a double salt represented by at least one of $(X_2O)_n \cdot Sb_2O_5$ and $(YO)_n \cdot Sb_2O_5$, where X represents a monovalent alkaline metal element, and Y represents a divalent alkaline earth metal element, and n represents a ratio of $X_2O$ or YO to $Sb_2O_5$ exceeding 0.7, the double salt having an adsorbed water elimination rate of not more than 50 min. as calculated in terms of titration time; or a polyol; wherein the double salt is contained in a range of 0.5 to 40 parts by weight based on 100 parts by weight of the thermoplastic resin.

Also, in the present invention, an electrical/electronic contact part includes a molded structure made of the thermoplastic resin composition and an electrical contact.

The thermoplastic resin composition for electrical/electronic contact parts according to the present invention is not specifically limited. Examples of the thermoplastic resin composition employable herein include polyester resin, polycarbonate resin, polyamide resin, polyacetal resin, polyphenylene sulfide resin, and polymer alloy including these resins as main components. Examples of the foregoing polyester resin include polyalkylene terephthalate such as polyethylene terephthalate and polybutylene terephthalate, and liquid crystal polyester showing melt anisotropy such as copolymer of polyethylene terephthalate with oxybenzoic acid.

Preferred one among these polyester resins is polyalkylene terephthalate such as polyethylene terephthalate and polybutylene terephthalate. Most preferred one among these polyester resins is polybutylene terephthalate resin.

The polybutylene terephthalate resin is a polymer obtained by the polycondensation of 1,4-butylene glycol with terephthalic acid or its ester. It may be a copolymer containing a polybutylene terephthalate unit in an amount of not less than 70% by weight.

Examples of the monomer to be copolymerized other than terephthalic acid or its ester are aliphatic acid such as isophthalic acid, naphthalenedicarboxylic acid, adipic acid, sebacic acid, trimellitic acid and succinic acid; aromatic polybasic acid; ester-forming derivative thereof; hydroxycarboxylic acid such as hydroxybenzoic acid; and ester-forming derivative thereof.

Examples of the glycol component other than 1,4-butylene glycol are alkylene glycol such as ethylene glycol, diethylene glycol, propylene glycol, trimethylene glycol, hexamethylene glycol, neopentyl glycol and cyclohexane dimethanol; aromatic diol such as bisphenol A and 4,4'-dihydroxybiphenyl; and alkylene oxide-added alcohol such as product of addition of 2 mols of ethylene oxide to bisphenol A and product of addition of 2 mols of propylene oxide to bisphenol A.

The polybutylene terephthalate resin of the present invention there may preferably have an intrinsic viscosity of from 0.7 to 1.4 dl/g, more preferably from 0.7 to 1.1 dl/g, particularly from 0.7 to 0.75 dl/g, as obtained by melt polymerization process, which provides a less conversion. The intrinsic viscosity as used herein is determined at a temperature of 30° C. in a 1:1 (by weight) mixture of phenol and tetrachloroethane. Such a polybutylene terephthalate resin is used so that 1,4-butylene glycol gas for protecting an electrical contact component can be produced. The amount of 1,4-butylene glycol gas to be produced is preferably not less than 1 ppm when heated to a temperature of 150° C. for 2 hours.

A specific example of the process for the detection of 1,4-butylene glycol gas includes charging 5 g of a pelletized resin in a 26-ml vial, closing the vial, heating the vial at a temperature of 150° C. for 2 hours, and then measuring the gas thus produced.

In the present invention, a halogenic and a phosphorus fire retardant is used as a fire retardant, the halogenic fire retardant being preferable.

Specific examples of the halogenated aromatic compound to be used as a halogenic fire retardant in the present invention are epoxy resin containing brominated bisphenol compound, brominated polycarbonate oligomer, decabromodiphenyl ether, and brominated phenoxy resin. Among these halogenated aromatic compounds, an epoxy resin containing a brominated bisphenol compound having a molecular weight of from 5,000 to 40,000 is preferable because it produces little components causing contact failure. The amount of the halogenated aromatic compound to be incorporated is from 1 to 50 parts by weight, preferably from 10 to 30 parts by weight based on 100 parts by weight of the thermoplastic resin. If, the amount of the halogenated aromatic compound to be incorporated is too low, sufficient fire retardance cannot be obtained. On the contrary, if the amount of the halogenated aromatic compound to be incorporated is too high, the produced amount of a gas causing contact failure is disadvantageously too high.

If a resin containing a halogen-containing copolymer component is used as a thermoplastic resin, the amount of the halogenated aromatic compound to be incorporated is such that the total halogen content in the resin composition is from 2 to 15% by weight.

The double salt of an oxide of alkaline metal with antimony pentaoxide to be used as an auxiliary fire retardant in the present invention is represented by $(X_2O)_n \cdot Sb_2O_5$ or $(YO)_n \cdot Sb_2O_5$, wherein X represents a monovalent alkaline metal element, Y represents a divalent alkaline earth metal element, and n represents a ratio of $X_2O$ or YO to $Sb_2O_5$ exceeding 0.7, having an adsorbed water elimination rate of not more than 50 min., preferably not more than 20 min., as calculated in terms of titration time. In particular, a 1:1 double salt of sodium oxide with antimony pentaoxide represented by $(Na_2O)_{1.0} \cdot Sb_2O_5$, such as NA-1070 commercially available from Nissan Chemical Industries, Ltd., is preferred.

As the double salt of antimony pentaoxide with sodium oxide, there is also known $(Na_2O)_{0.7} \cdot Sb_2O_5$. Various experiments made by the inventors with the double salt represented by $(Na_2O)_{0.7} \cdot Sb_2O_5$ and the double salt represented by $(Na_2O)1.0.Sb2O5$ particularly preferred as a fire retardant in the present invention as mentioned above, will be described.

EXPERIMENT 1

$(Na_2O)_{0.7} \cdot Sb_2O_5$ and $(Na_2O)_{1.0} \cdot Sb_2O_5$ were measured for titration time corresponding to absorbed water elimination rate by means of a Karl Fischer moisture meter. As a result, the following data were obtained.

|  | Moisture content | Titration time |
|---|---|---|
| $(Na_2O)_{0.7} \cdot Sb_2O_5$ | 6,215 ppm | 117 min. |
| $(Na_2O)_{1.0} \cdot Sb_2O_5$ | 8,215 ppm | 15 min. |

As can be seen in these experiment data, $(Na_2O)_{1.0} \cdot Sb_2O_5$ exhibits a very large adsorbed water elimination rate under dried conditions as compared with $(Na_2O)_{0.7} \cdot Sb_2O_5$.

EXPERIMENT 2

The change of melt viscosity with retention time was measured by means of a capillograph (Capillograph 1C, available from Toyo Seiki Seisakusyo K. K.). In general, the temperature of a polybutylene terephthalate resin during molding is from 240° C. to 270° C. The melt stability at 270° C. was evaluated herein. The samples used were pelletized samples of Example 1 and Comparative Example 2 mentioned later. About 25 g of the pelletized sample were measured. The measurement was conducted at a shearing rate of 121.6/sec., a retention temperature of 270° C. and a drying temperature of 135° C. for 6 to 8 hours.

Figure 17:
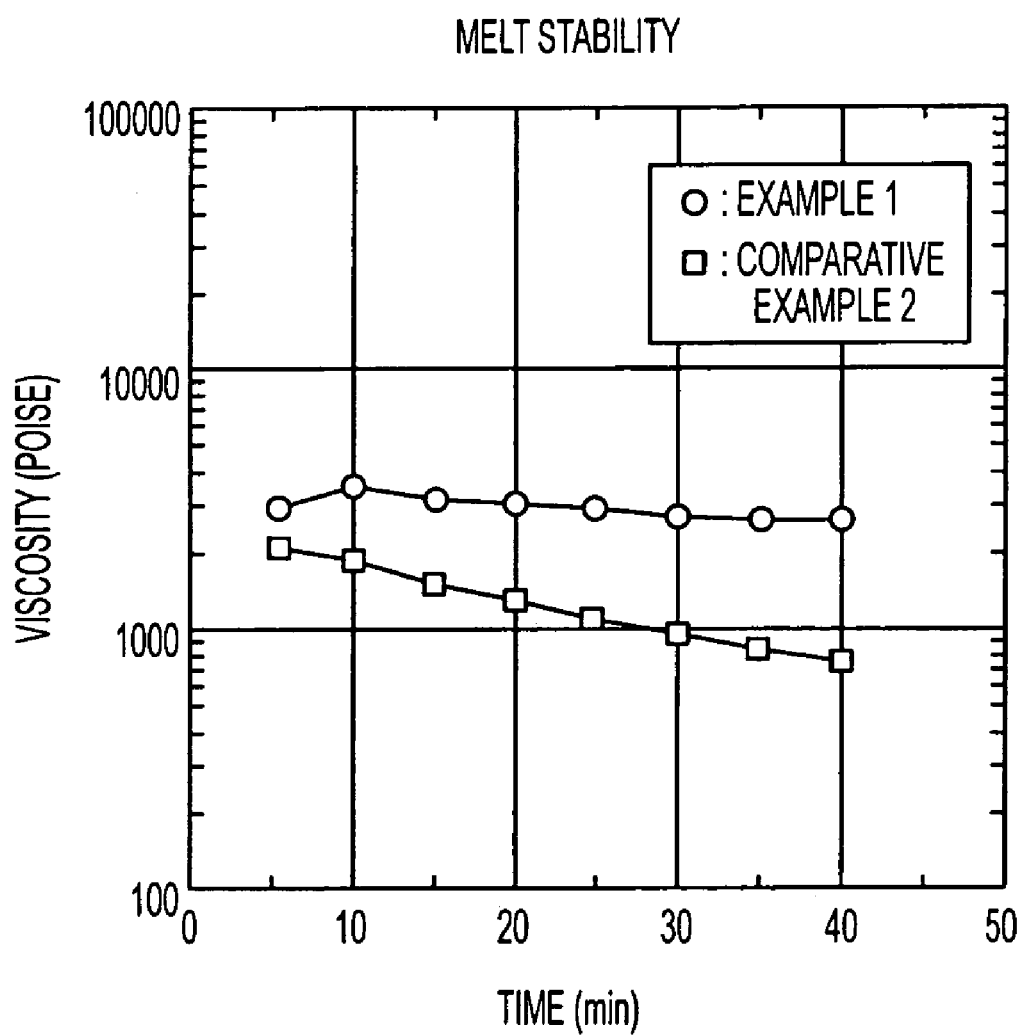
FIG. 17 is a graph illustrating the data of melt stability of Example 1 of the present invention using $(Na_2O)_{1.0} \cdot Sb_2O_5$ as an auxiliary fire retardant and Comparative Example 2 using $(Na_2O)_{0.7} \cdot Sb_2O_5$ as an auxiliary fire retardant by capillograph.

The results are as set forth in FIG. 17. As can be seen in the results of experiment, $(Na_2O)_{1.0} \cdot Sb_2O_5$ exhibits an extremely small change of melt viscosity with time and hence an excellent melt stability as compared with $(Na_2O)_{0.7} \cdot Sb_2O_5$. It was thus seen that $(Na_2O)_{1.0} \cdot Sb_2O_5$ gives no change of physical properties and thus makes it possible to recycle a product having stable properties.

EXPERIMENT 3

GC/MS (gas chromatograph/mass spectrograph; HS-101/GC-8700/SPB-1/ITD, available from Perkin Elmer Co., Ltd.) was used to measure outgassed amount per retention time for the evaluation of outgas. 1.00 g of the sample was measured out. The outgassing was effected at a temperature of 120° C. for 9 hours. The column oven was kept at a temperature of 35° C. for 3 minutes, heated at a rate of 10° C./min. to a temperature of 200° C., and heated at a rate of 30° C./min. to a temperature of 250° C. where it was then kept for 5 minutes.

Figure 18:
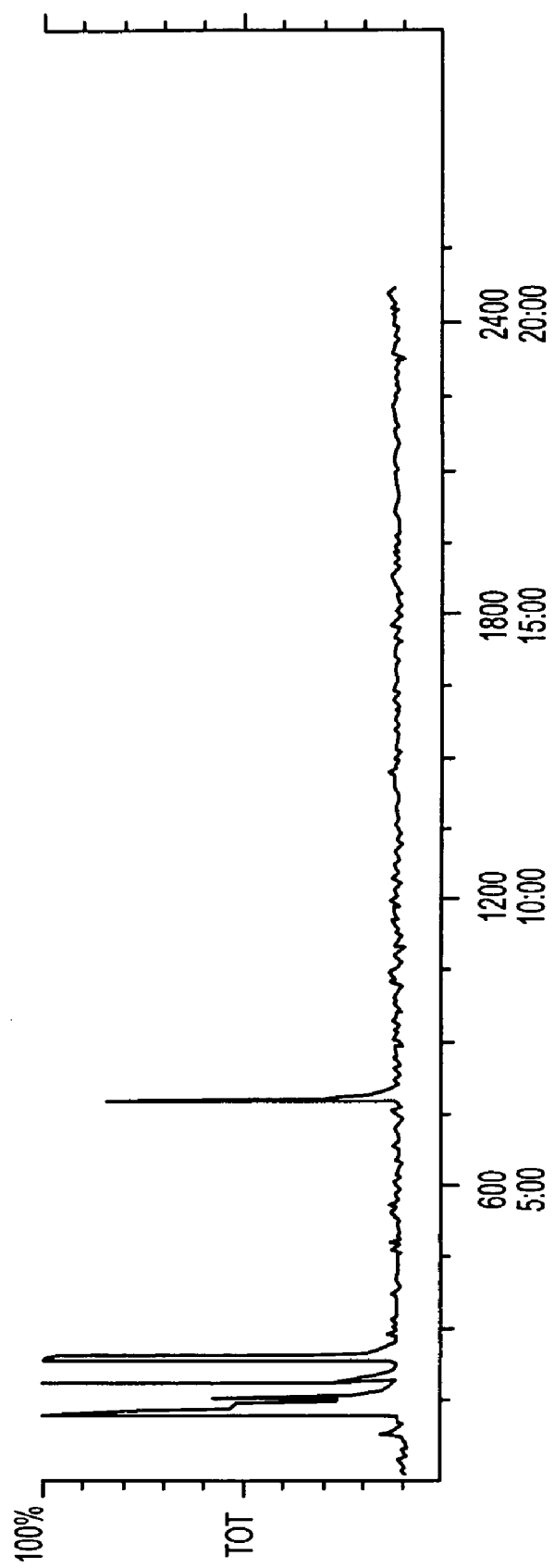
FIG. 18 is a chart illustrating the condition of production of γ-butyrolactone gas from Example 1 of the present invention using $(Na_2O)_{1.0} \cdot Sb_2O_5$ as an auxiliary fire retardant by GC/MS.
Figure 19:
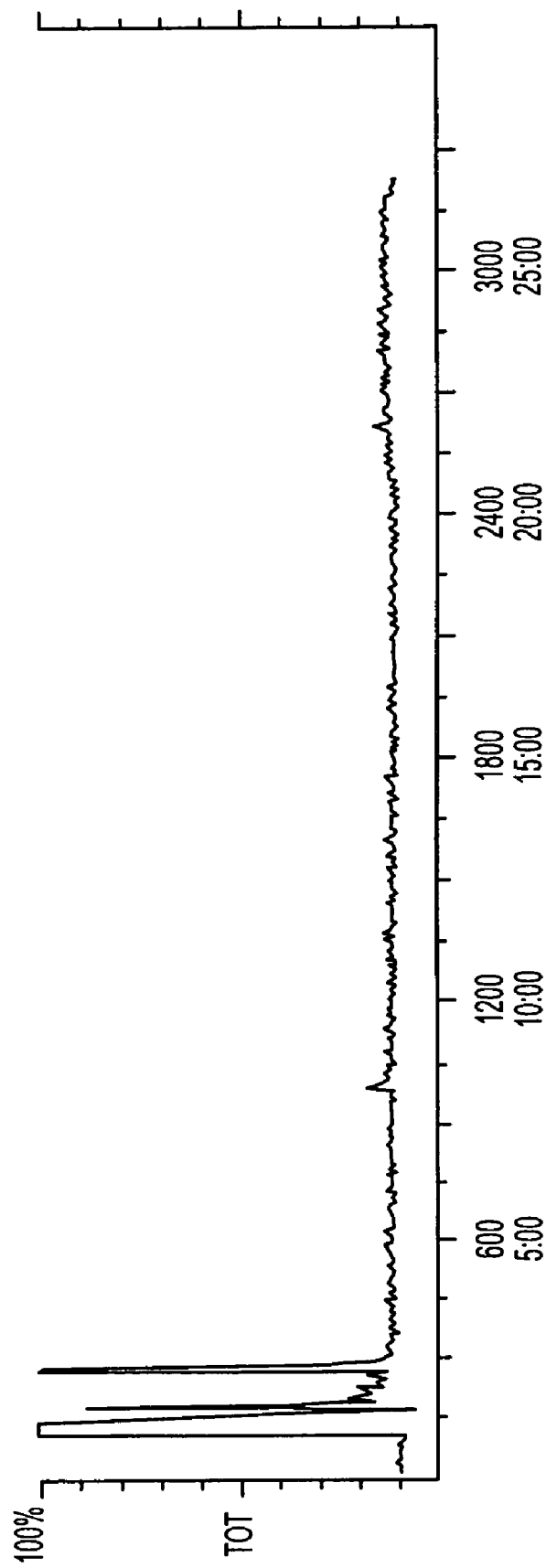
FIG. 19 is a chart illustrating the condition of production of γ-butyrolactone gas from Comparative Example 2 using $(Na_2O)_{0.7} \cdot Sb_2O_5$ as an auxiliary fire retardant by GC/MS.

The results were as set forth in FIG. 18 (Comparative Example 2) and FIG. 19 (Example 1). As can be seen in these experimental data, $(Na_2O)_{1.0} \cdot Sb_2O_5$ (Example 1 in FIG. 19) does not produce γ-butyrolactone, which increases the contact resistance of the electrical contact, as opposed to $(Na_2O)_{0.7} \cdot Sb_2O_5$ (Comparative Example 2 in FIG. 18), which does so.

As proved by the foregoing experimental results, the most preferred example of the double salt of an oxide of alkaline metal with antimony pentaoxide to be used as an auxiliary fire retardant in the present invention is a 1:1 double salt of sodium oxide with antimony pentaoxide represented by $(Na_2O)_{1.0} \cdot Sb_2O_5$. Besides these double salts, the foregoing double salt of an oxide of alkaline metal with antimony pentaoxide to be used as an auxiliary fire retardant in the present invention is represented by $(X_2O)_n \cdot Sb_2O_5$ or $(YO)_n \cdot Sb_2O_5$, wherein X represents a monovalent alkaline metal element, Y represents a divalent alkaline earth metal element, and n represents a ratio of $X_2O$ or YO to $Sb_2O_5$ exceeding 0.7, having an adsorbed water elimination rate of not more than 50 min., preferably not more than 20 min., as calculated in terms of titration time, can be used to provide a thermoplastic resin composition having an excellent melt stability. Thus, a product having stable properties can be recycled. At the same time, it gives a synergism of the enhancement of absorption of halogen gas and the inhibition of the production of γ-butyrolactone, which increases the contact resistance of the electrical contact, making it possible to drastically reduce contact failure.

The amount of the foregoing double salt of an oxide of alkaline metal with antimony pentaoxide represented by $(Na_2O)_{1.0} \cdot Sb_2O_5$ of the present invention to be incorporated is from 0.5 to 40 parts by weight, preferably from 1 to 20 parts by weight based on 100 parts by weight of the thermoplastic resin composition. If the amount of the double salt to be incorporated is too low, sufficient fire retardance cannot be obtained. On the contrary, if the amount of the double salt to be incorporated is too high, it advantageously adds to the cost.

In the present invention, a polyol can produce a contact-protecting gas component that can inhibit the rise in the contact resistance. The polyol can be advantageously kneaded with the thermoplastic resin which produces a predetermined amount of 1,4-butylene glycol gas so that the terminal hydroxyl group in the polyalkylene glycol reacts with the molecular chain in the polybutylene terephthalate resin to produce 1,4-butylene glycol gas which acts as a contact-protecting component.

Specific examples of the polyol are ethylene glycol, 1,2-propylene glycol, 1,3-propylene glycol, 1,2-butylene glycol, 1,3-butylene glycol, 1,4-butylene glycol, 2,3-butylene glycol, 1,5-pentanediol, 2-methyl-2,4-pentanediol, 2-ethyl-1,3-hexanediol, diethylene glycol, glycerin, polyethylene glycol, polypropylene glycol, polybutylene glycol, and polyglycerin. Preferred polyols are polyalkylene glycols having a molecular weight of not more than 20,000 such as polyethylene glycol, polypropylene glycol and polybutylene glycol, more preferably those having a molecular weight of not more than 10,000, particularly not more than 5,000.

The amount of the polyol of the present invention to be incorporated is from 0.2 to 10 parts by weight, preferably from 0.5 to 5 parts by weight based on 100 parts by weight of the polybutylene terephthalate resin. If the amount of the polyol to be incorporated is too low, the production of a contact-protecting gas is insufficient, thereby making it impossible to provide a sufficient effect of eliminating contact failure. On the contrary, if the amount of the polyol to be incorporated is too high, it disadvantageously deteriorates the mechanical strength and melt thermal stability of the thermoplastic resin composition.

The resin composition of the present invention may further includes other thermoplastic resins such as polyamide, polycarbonate, polyethylene terephthalate and liquid crystal polyester incorporated therein in an amount of not more than 50% by weight based on the total weight of the resin composition to form a polymer alloy as necessary so far as the effect of the present invention is not impaired.

The resin composition of the present invention may further includes known substances commonly added to thermoplastic resins, such as inorganic reinforcing filler, lubricant, oxidation inhibitor, various stabilizers, impact modifier, plasticizer, releaser, colorant, crystallization accelerator and ultraviolet absorbent, incorporated therein to obtain desired properties depending on the purpose.

Examples of the inorganic filler are fibrous filler such as glass fiber, carbon fiber, silica fiber, silica alumina fiber, zirconia fiber, boron nitride fiber, silicon nitride fiber, potassium titanate fiber and gypsum fiber; carbon black; silica; quartz powder; glass bead; glass powder; calcium silicate; kaolin; talc; clay; and mica. Particularly glass fiber is preferable among these inorganic fillers. However, geige goods used for glass fiber produces a gas component that adversely affects the electrical contact. Thus, glass fibers which less produce such a gas component are preferably selected.

For example, the thermoplastic resin composition according to the present invention is applied to a closed electromagnetic relay 5 in which a mobile block 3 is rotatively supported on the top central part of an electromagnetic block 2 housed in a box base 1 and a case 4 is airtightly fitted on the base 1 as shown in FIG. 1. In the closed electromagnetic relay 5, a main body 1a of the base 1, a spool 2a of the electromagnetic block 1, a central connecting portion 3a of the mobile block 3, and the case 4 are molded by a thermoplastic resin composition of the present invention. However, all these structures do not need to be molded by a thermoplastic resin composition of the present invention. Other molding materials may be properly selected.

Figure 2:
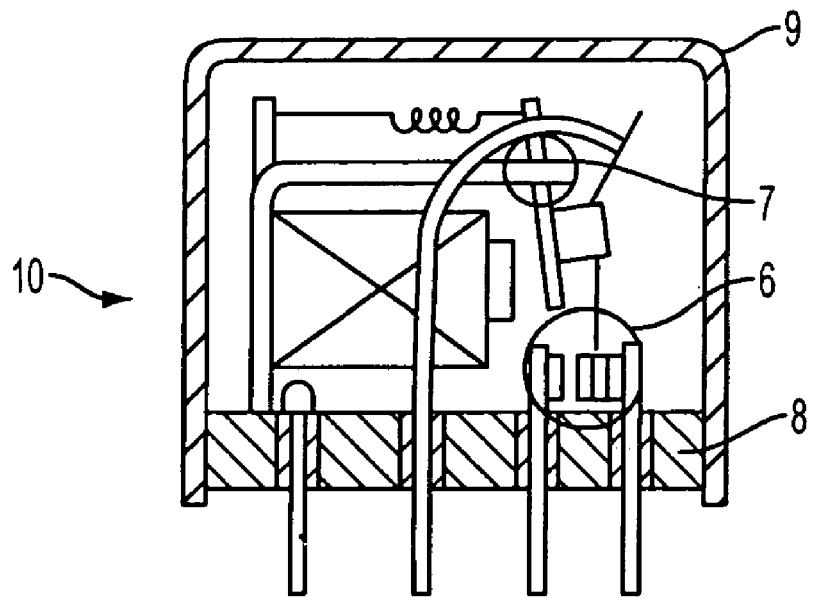
FIG. 2 is a sectional view of a relay for communications apparatus according to the present invention.
Figure 3:
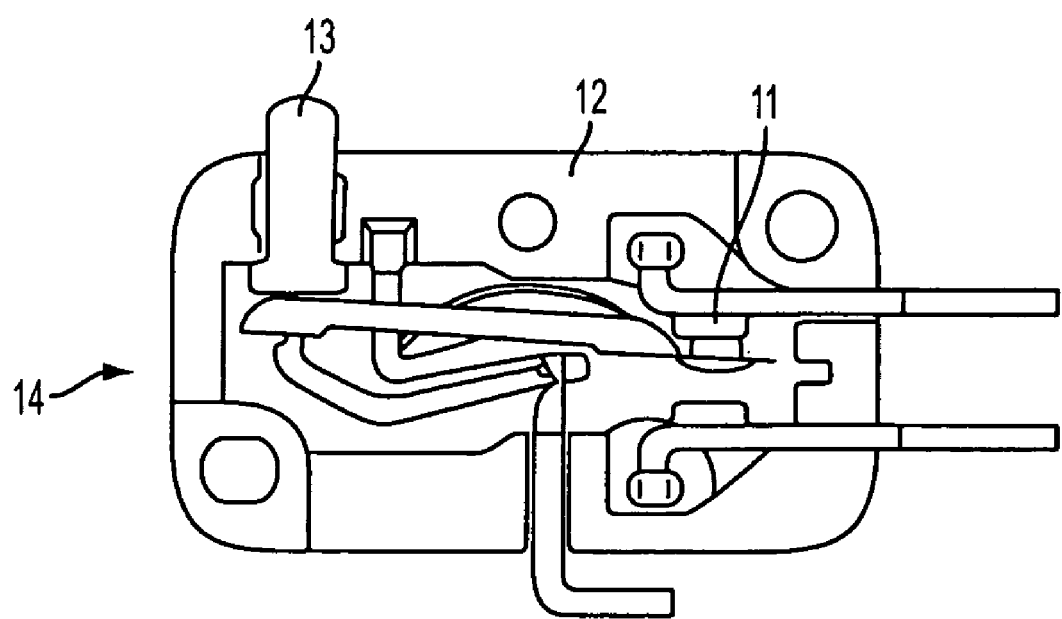
FIG. 3 is a front view illustrating an inner structure of a microswitch according to the present invention.
Figure 4:
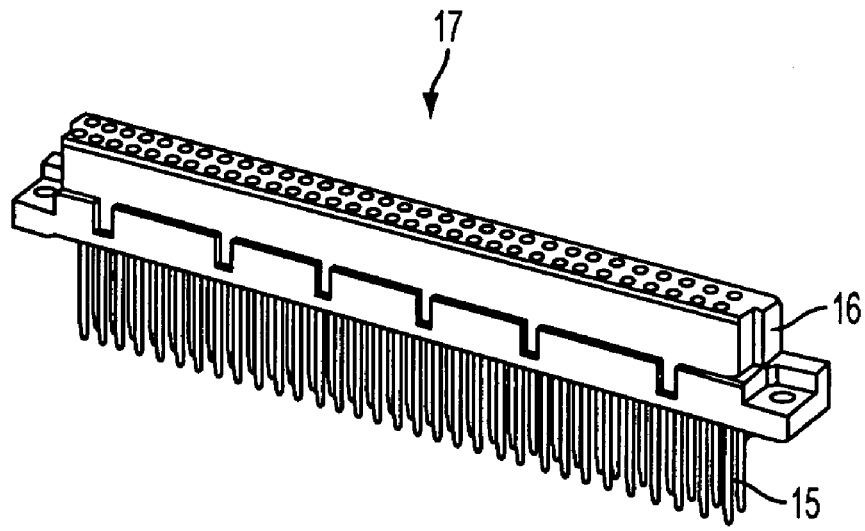
FIG. 4 is a perspective view of a connector socket according to the present invention.
Figure 5:
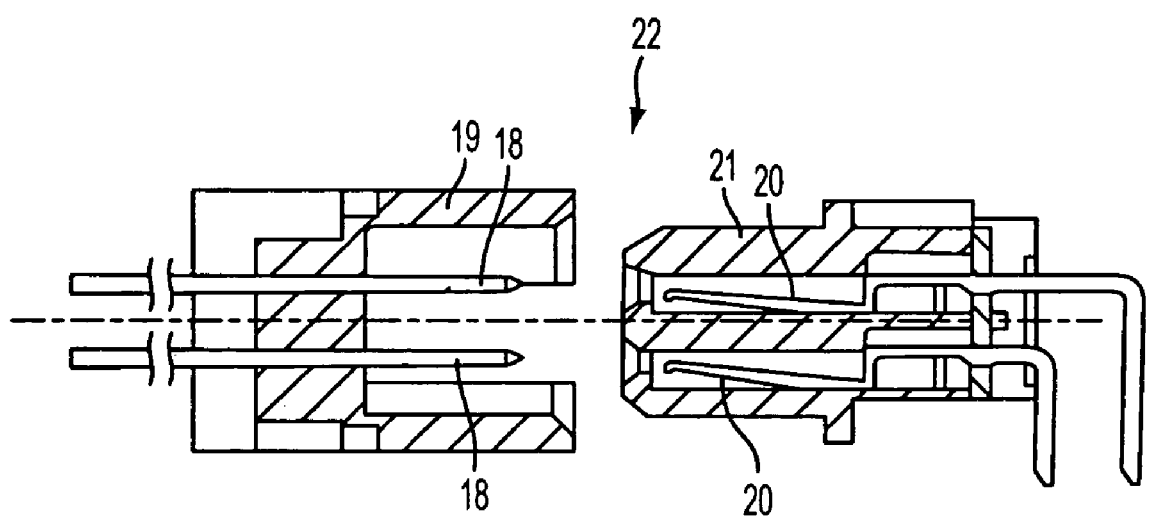
FIG. 5 is a sectional view of a connector according to the present invention.
Figure 6:
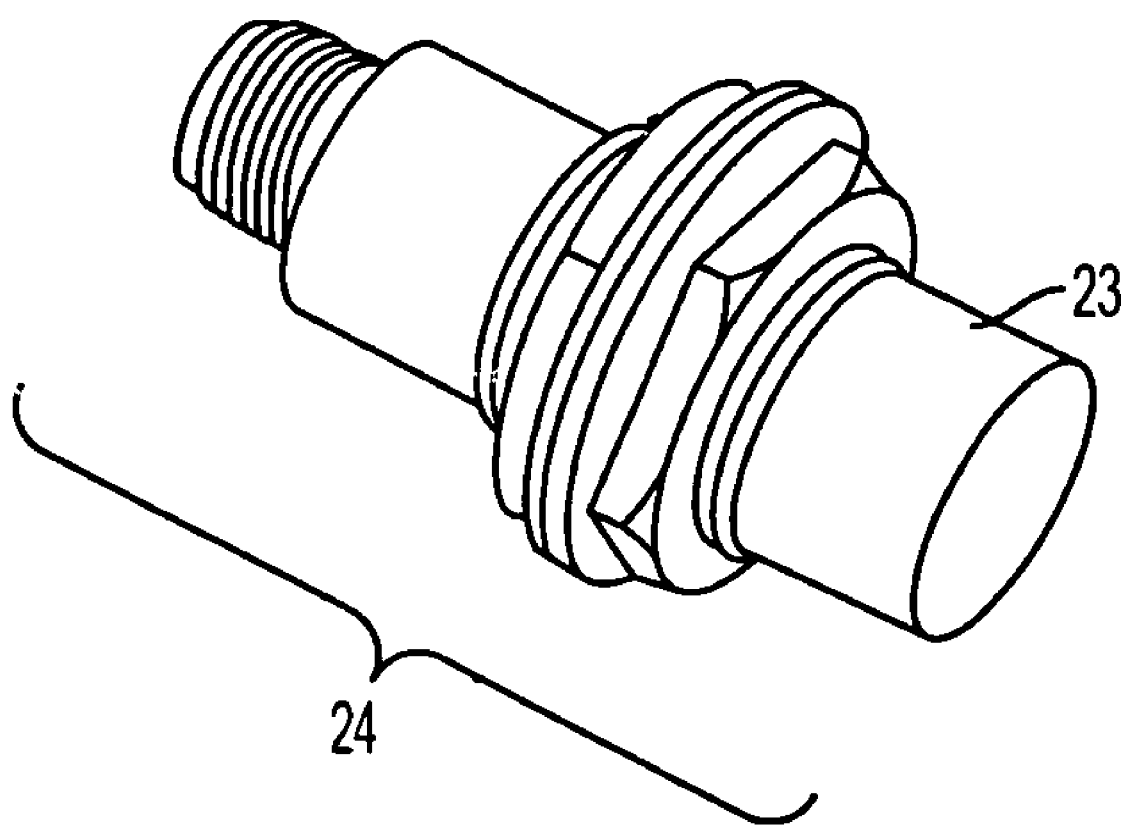
FIG. 6 is a perspective view of a photoelectric sensor according to the present invention.

Further, other examples are described as follows. A closed relay for communications apparatus 10 includes a PB substrate 8 and a case cover 9 having a contact mechanism 6 and a connecting portion 7 housed therein, wherein the molded structures of the PB substrate 8 and the case cover 9 are made of a thermoplastic resin composition of the present invention, as shown in FIG. 2. A microswitch 14 includes pressbutton 13 and a housing 12 having a contact mechanism 11 housed therein, wherein the molded structures of the pressbutton 13 and the microswitch are made of a thermoplastic resin composition of the present invention, as shown it FIG. 3. A connector socket 17 includes a housing 16 into which a plurality of terminals 15 is integrally inserted by insert molding, where in the housing 16 is molded by a thermoplastic resin composition of the present invention, as shown in FIG. 4. A connector 22 includes a socket main body 19 having pin terminals 18 integrally fixed therein by insert molding in such an arrangement that they pierce therethrough and a plug main body 21 having contacts 20 which electrically conduct when engaged with the pin terminals 18, wherein the molded structures of the socket main body 19 and the plug main body 21 are made of a thermoplastic resin composition of the present invention, as shown in FIG. 5. A photoelectric sensor 24 has its tip 23 molded by a thermoplastic resin composition of the present invention, as shown in FIG. 6. Besides these examples, the thermoplastic resin composition can be applied to various electrical/electronic parts including as constituent elements an electrical contact and a molded structure, such as actuator, microsensor and microactuator. In any of these examples, the thermoplastic resin composition of the present invention produces less gases which cause contact failure at the electrical contact but produces a contact-protecting polyol gas over a prolonged period of time, thereby inhibiting the rise in the contact resistance. In particular, the thermoplastic resin composition of the present invention can be advantageously used for electrical/electronic contact parts having an electrical contact present in an atmosphere from which a polyol gas cannot easily scatter, such as relay for communications apparatus and closed switch.

Examples of the metal constituting an electrical contact in relay, switch, connector, sensor, etc. according to the present invention include Au, Au—Ag, Pt—Au—Ag, Ag—Pd, Pd—Ni, Ag, Ag—Ni, Ag—CdO, Ag—SnO$_2$, Sn—Pd, and Ni.

The present invention will be further described in the following examples, but the present invention should not be construed as being limited thereto unless they depart from the scope of the present invention.

EXAMPLE 1

A pelletized resin composition including 100 parts by weight of a polybutylene terephthalate resin (produces 1,4-butylene glycol gas in an amount of 1.4 ppm when heated to a temperature of 150° C. for 2 hours) having an intrinsic viscosity of 0.7 dl/g as determined at 30° C. in a 1:1 (by weight) mixture of phenol and tetrachloroethane as a solvent, obtained by melt polymerization; 22 parts of a brominated epoxy resin (molecular weight: 40,000; epoxy equivalent: 20,000) having a structure represented by the following chemical formula; 1 part by weight of a polyethylene glycol (molecular weight: 4,000); 11 parts by weight of a double salt of oxide of alkaline metal with antimony pentaoxide represented by $(Na_2O)_{1.0}(Sb_2O_6)_{1.0}$; and 24 parts by weight of glass fiber was prepared by a predetermined method.

In some detail, additives other than glass fiber and a polybutylene terepthalate resin were mixed to be homogeneously blended. The mixture thus obtained was then extruded through a twin-screw extruder having a screw diameter of 37 mm and L/D of 33 with glass fiber being side-fed.

During this extrusion, the cylinder was kept at 245° C. The cylinder was evacuated through a vent disposed between the glass fiber feed port and the die so that the mixture was melt-mixed while removing the volatile content. The strand thus extruded from the die was cooled with water, and then cut to obtain a pelletized sample of resin composition.

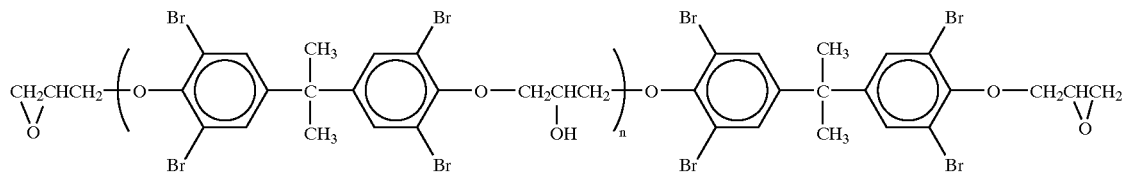

COMPARATIVE EXAMPLE 1

A pelletized sample of resin composition was prepared in the same manner as in Example 1 except that 9 parts by weight of Sb$_2$O$_3$ were incorporated instead of 11 parts by weight of the double salt of an oxide of alkaline metal with antimony pentaoxide represented by $(Na_2O)_{1.0} \cdot Sb_2O_5$.

COMPARATIVE EXAMPLE 2

A pelletized sample of resin composition was prepared in the same manner as in Example 1 except that 11 parts by weight of $(Na_2O)_{0.7} \cdot Sb_2O_3$ were incorporated instead of 11 parts by weight of the double salt of an oxide of alkaline metal with antimony pentaoxide represented by $(Na_2O)_{1.0} \cdot Sb_2O_5$.

These pelletized samples of Example 1, Comparative Example 1 and Comparative Example 2 were each measured for amount of free halogen gas (bromine gas) produced upon heating, produced amount of γ-butyrolactone gas, metal corrosion and fire retardance to evaluate various physical properties. The results are set forth in Table of FIG. 7.

The measurement of produced amount of halogen gas (bromine gas), produced amount of γ-butyrolactone gas, metal corrosion and fire retardance for the evaluation of physical properties were conducted in the following manner.

1. Method for the Measurement of Free Halogen Gas Component Produced Upon Heating 0.2 g of each pelletized sample was heated in a stream of nitrogen to a temperature of 260° C. for 1 hour or to a temperature of 300° C. for 0.5 hours. The gas which had passed over the sample was then passed through a 0.3% aqueous solution of hydrogen peroxide so that the gas component produced upon heating was absorbed by the aqueous solution.

The crystalline deposit on the wall of the wall of the tube was then recovered by washing with a 0.3% aqueous solution of hydrogen peroxide. The solution obtained by combining these aqueous solutions was analyzed by ion chromatography to determine the quantity of halogen ions.

2. Metal Corrosion 50 g of each pelletized sample was put in a glass wide-mouthed bottle having an inner volume of 120 ml. The sample was put on a silver plate the surface of which had been polished, and placed on a glass dish. The glass wide-mouthed bottle was then closed. The bottle was then heated in a 150° C. hot air oven. After a predetermined period of time, the silver plate was withdrawn, and then visually observed for surface condition. The properties were evaluated in accordance with the following criteria:

E: No corrosion (no change of external appearance of silver plate)
G: Slight corrosion (slight discoloration or fog on the surface of silver plate)
F: Some corrosion observed (definite discoloration or fog on the surface of silver plate)
P: Remarkable corrosion (silver plate discolored black or brown on the surface, corrosion went into the interior thereof)

3. Fire Retardance

Five 1/32-inch thick specimens were evaluated for fire retardance in accordance with Underwriter's Laboratory's UL94 Specification.

4. Measurement of Produced Amount of γ-butyrolactone gas 5 g of each pelletized sample was sealed in a 26-ml vial. The sample was then heated at a temperature of 150° C. for 2 hours. The gas thus produced upon heating was then analyzed by gas chromatography. The weight of the gas thus produced was represented in ppm based on the weight of the pelletized sample. The measurement conditions are given below.

Apparatus: Type GC-14A gas chromatography (available from Shimadzu Corp.)
Column: Type OV-17 capillary column, Column temperature: 50° C. (1 min.), 50–280° C. (5° C./min.)
Carrier gas: Nitrogen
Detector: FID
Data processor: Chromatopack CR7A (available from Shimadzu Corp.)

As can be seen from the Table of FIG. 7 showing the results of the measurement of amount of free halogen gas produced upon heating, produced amount of γ-butyrolactone gas, metal corrosion and fire retardance, Example 1 produces a remarkably small amount of a halogen gas (bromine gas) causing the rise in the contact resistance as compared with Comparative Example 1 and produces no γ-butyrolactone gas as produced in Comparative Example 2. Accordingly, it can be seen that the contact resistance of the electrical contact is stable.

It can also be seen in the dry corrosion test with silver plate that the example of the present invention shows a remarkable corrosion resistance while maintaining the same level of fire retardance as compared with Comparative Example 1 using $Sb_2O_2$ as auxiliary fire retardant.

COMPARATIVE EXAMPLE 3

A pelletized sample of resin composition was prepared in the same manner as in Example 1 except that no polyethylene glycol was blended.

COMPARATIVE EXAMPLE 4

A pelletized sample of resin composition was prepared in the same manner as in Example 1 except that, as the polybutylene terephthalate resin, there was used a polybutylene terephthalate resin (produces 1,4-butylene glycol gas in an amount of 0.6 ppm when heated to a temperature of 150° C. for 2 hours) having an intrinsic viscosity of 0.85 dl/g obtained by solid phase polymerization and no polyethylene glycol was blended.

These pelletized samples of Example 1, Comparative Example 3 and Comparative Example 4 were each measured for amount of gas containing 1,4-butylene glycol gas produced upon heating, fire retardance and resistance of contact in relay to evaluate various physical properties and life of relay. The results are set forth in Tables of FIGS. 8A and 8B.

The measurement of amount of gas containing 1,4-butylene glycol gas produced upon heating and fire retardance for the evaluation of physical properties were conducted in the following manner.

1. Qualitative Analysis of Organic Gas Component

GC/MS (gas chromatograph/mass spectrograph; HS-101/GC-8700/SPB-1/ITD, available from Perkin Elmer Co., Ltd.) was used to measure outgassed amount per retention time for the evaluation of outgas. In some detail, 1.00 g of the sample was measured out in a 26-ml vial. The outgassing was effected at a temperature of 120° C. for 9 hours. The column oven was kept at a temperature of 35° C. for 3 minutes, heated at a rate of 10° C./min. to a temperature of 200° C., and heated at a rate of 30° C./min. to a temperature of 250° C. where it was then kept for 5 minutes.

2. Measurement of Produced Amount of Organic Gas Component 5 g of the sample (pelletized resin composition) was sealed in a 26-ml vial. The sample was then heated to a temperature of 150° C. for 2 hours. The gas thus produced was then analyzed by gas chromatography. The weight of the gas thus produced was represented in ppm based on the weight of the sample. The measurement conditions will be given below.

Apparatus: Type GC-14A gas chromatography (available from Shimadzu Corp.)
Column: Type OV-17 capillary column, Column temperature: 50° C. (1 min.), 50–280° C. (5° C./min.)
Carrier gas: Nitrogen
Detector: FID
Data processor: Chromatopack CR7A (available from Shimadzu Corp.)

3. Fire Retardance

Five 1/32-inch thick specimens were evaluated for fire retardance in accordance with Underwriter's Laboratory's UL94 Specification.

On the other hand, for the evaluation of relay life, the relay shown in FIG. 1 from which the top plate was removed and 60 g of the sample were sealed in a glass vessel having an inner volume of 110 ml. The glass vessel was then placed in a 85° C. hot air oven. A 5V–5 Hz drive voltage from a drive circuit was applied across the coil in the relay. Any of 0V, 10V–10 mA and 28V–10 mA dc voltages from a power supply was applied across the contacts in the relay. The operation of the relay was suspended every predetermined operation cycles to measure the resistance of the contacts by means of a resistometer. An electrical contact which reaches a resistivity of not less than 100 mΩ by 2.5 million cycles is judged as a poor contact. The ratio of the number of poor contacts to the total number of contacts tested is percent defective. The same relay sample was tested free of thermoplastic resin composition sample as a blank.

As can be seen in FIG. 8A showing the results of amount of gas produced upon heating and fire retardance, Example 1 produced 1,4-butylene glycol gas, which acts on the electrical contact as a contact-protecting component, and other polyol gases in a very large amount as compared with Comparative Examples 1 and 2. It can thus be seen that the electrical contact of Example 1 exhibits a stable contact resistance.

Further, as can be seen in FIG. 8B showing the results of evaluation of relay life, the relay of Example 1 showed 0% occurrence of poor contacts which reach a resistivity of not less than 100 mΩ by 2.5 million operation cycles regardless of the magnitude of the voltage applied. It can thus be seen that the relay of Example 1 has a longer life than that of Comparative Examples 1 and 2.

Further, in connection with the evaluation of the relay life, the inventors evaluated the mechanical life of the contact of a relay including a structure molded by a thermoplastic resin composition of the present invention by measuring the contact resistance (CR) of the contact in terms of the function of the number of opening and closing the contact. The contact to be measured was an Au—Ag system.

In a 85° C. atmosphere, the relay was measured for contact resistance at a contact opening/closing frequency of 5 Hz under a load of (1) 50V–100 mA, (2) 28V–100 mA, (3) 10V–10 mA, and (4) 0V–0 mA until the number of opening and closing the contact reached 2.5 millions. The number of samples measured was 10. The sample used was a closed electromagnetic relay molded by the thermoplastic resin composition of Example 1 as shown in FIG. 1. The electromagnetic relay had not been degassed by vacuum baking.

Figure 9:
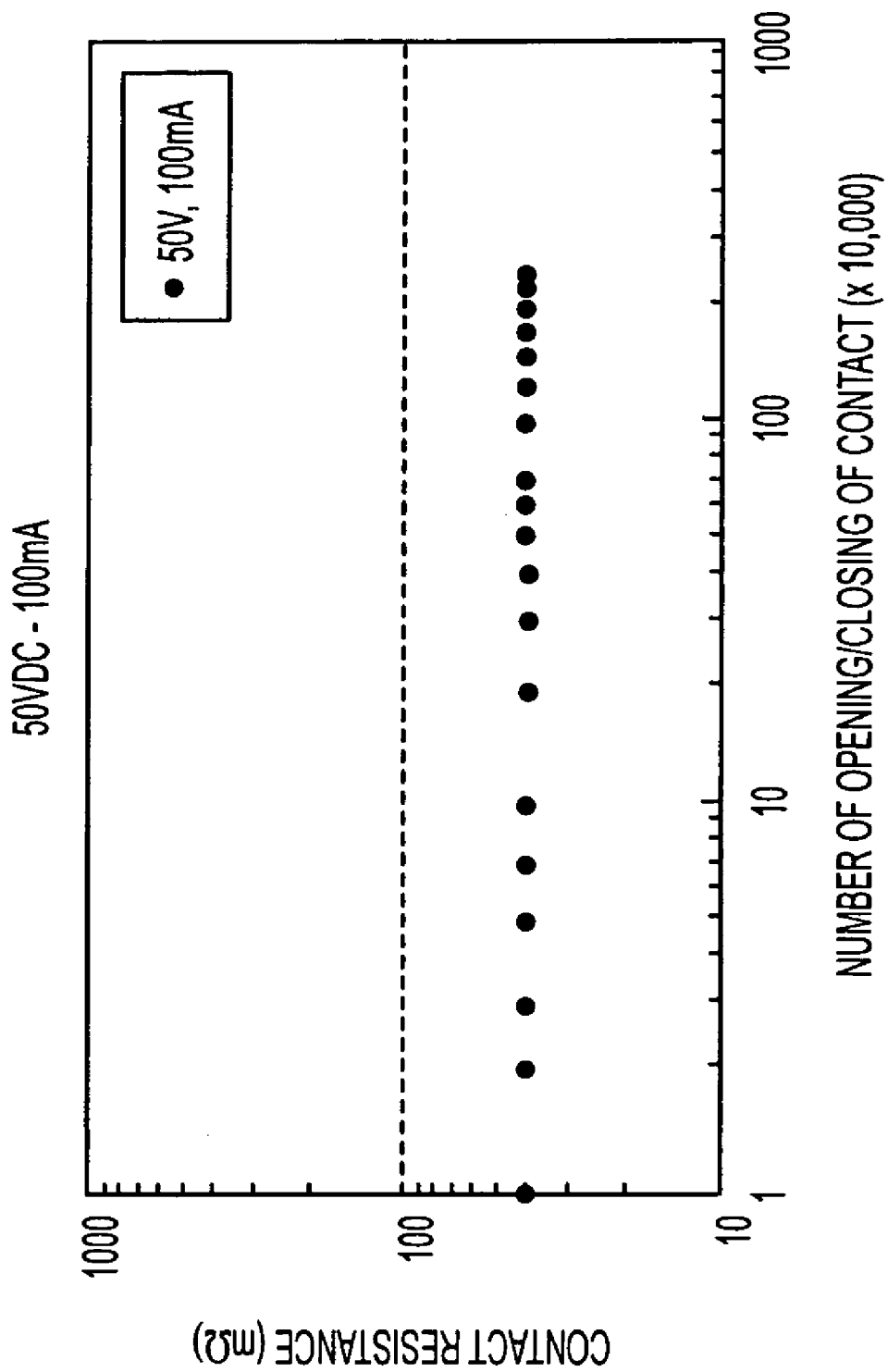
FIG. 9 is a graph illustrating the results of the measurements of the mechanical life characteristics of an electromagnetic relay according to the present invention under a load of 50V–100 mA.
Figure 10:
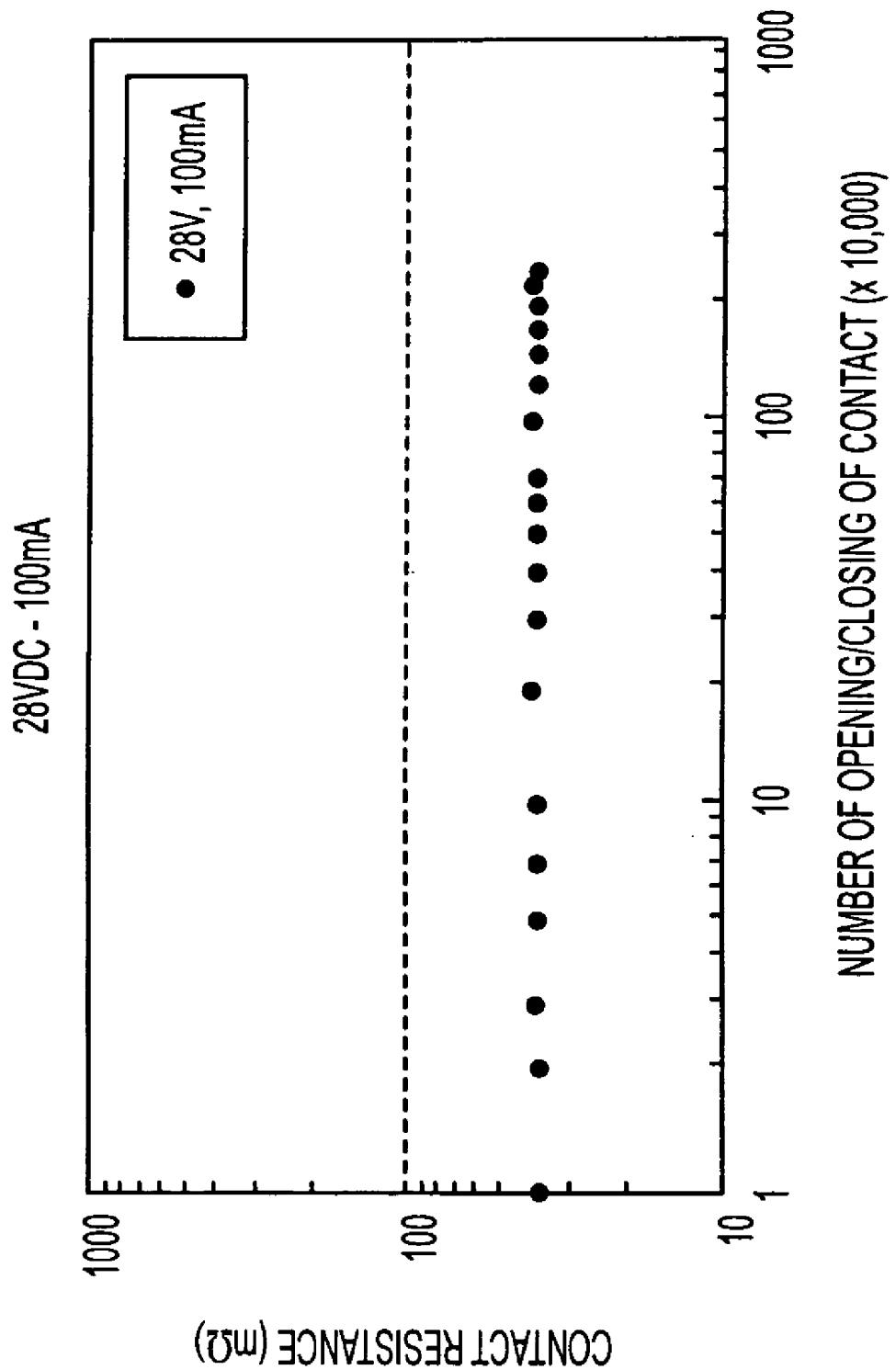
FIG. 10 is a graph illustrating the results of the measurements of the mechanical life characteristics of an electromagnetic relay according to the present invention under a load of 28V–100 mA.
Figure 11:
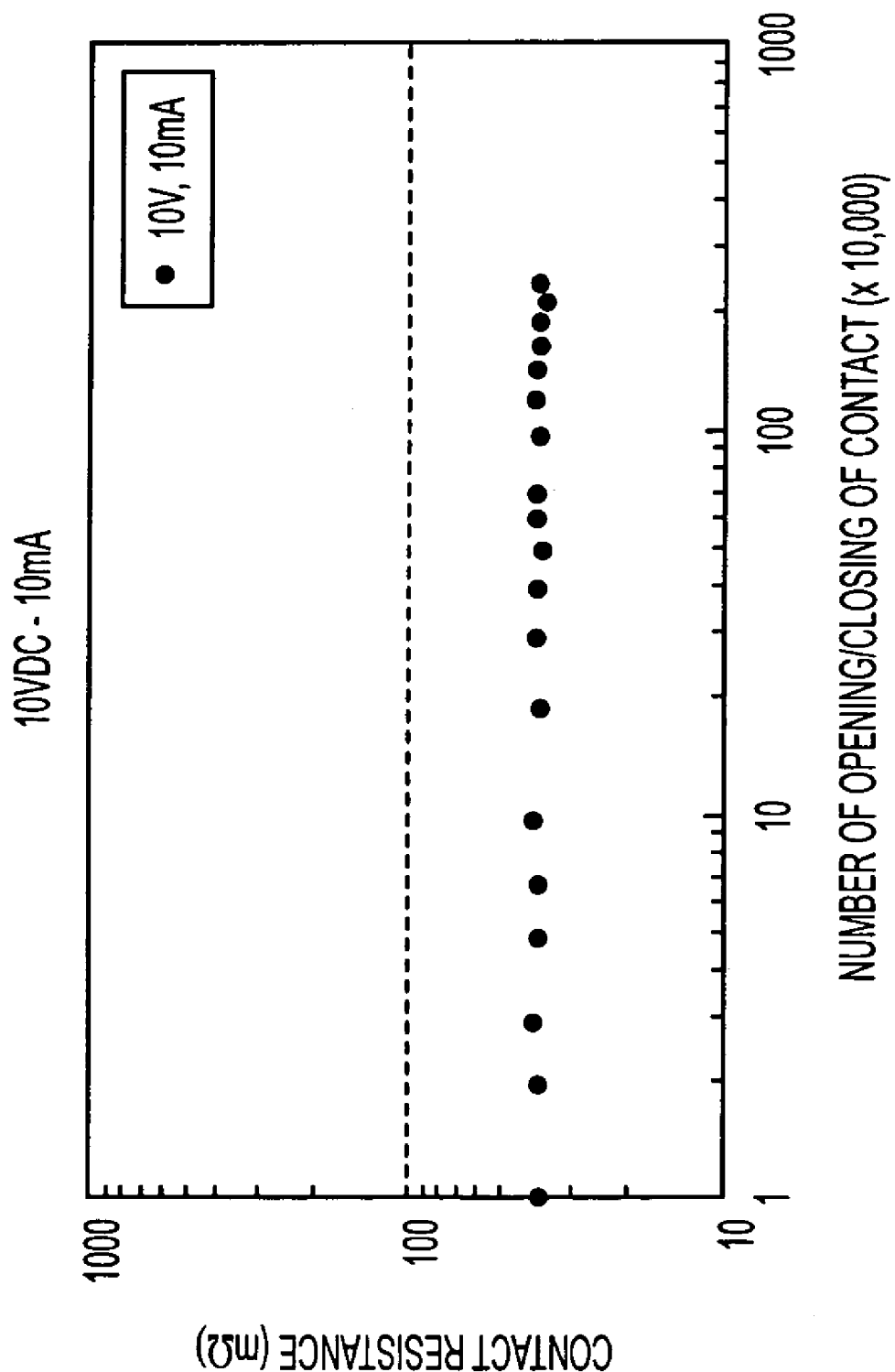
FIG. 11 is a graph illustrating the results of the measurements of the mechanical life characteristics of an electromagnetic relay according to the present invention under a load of 10V–100 mA.
Figure 12:
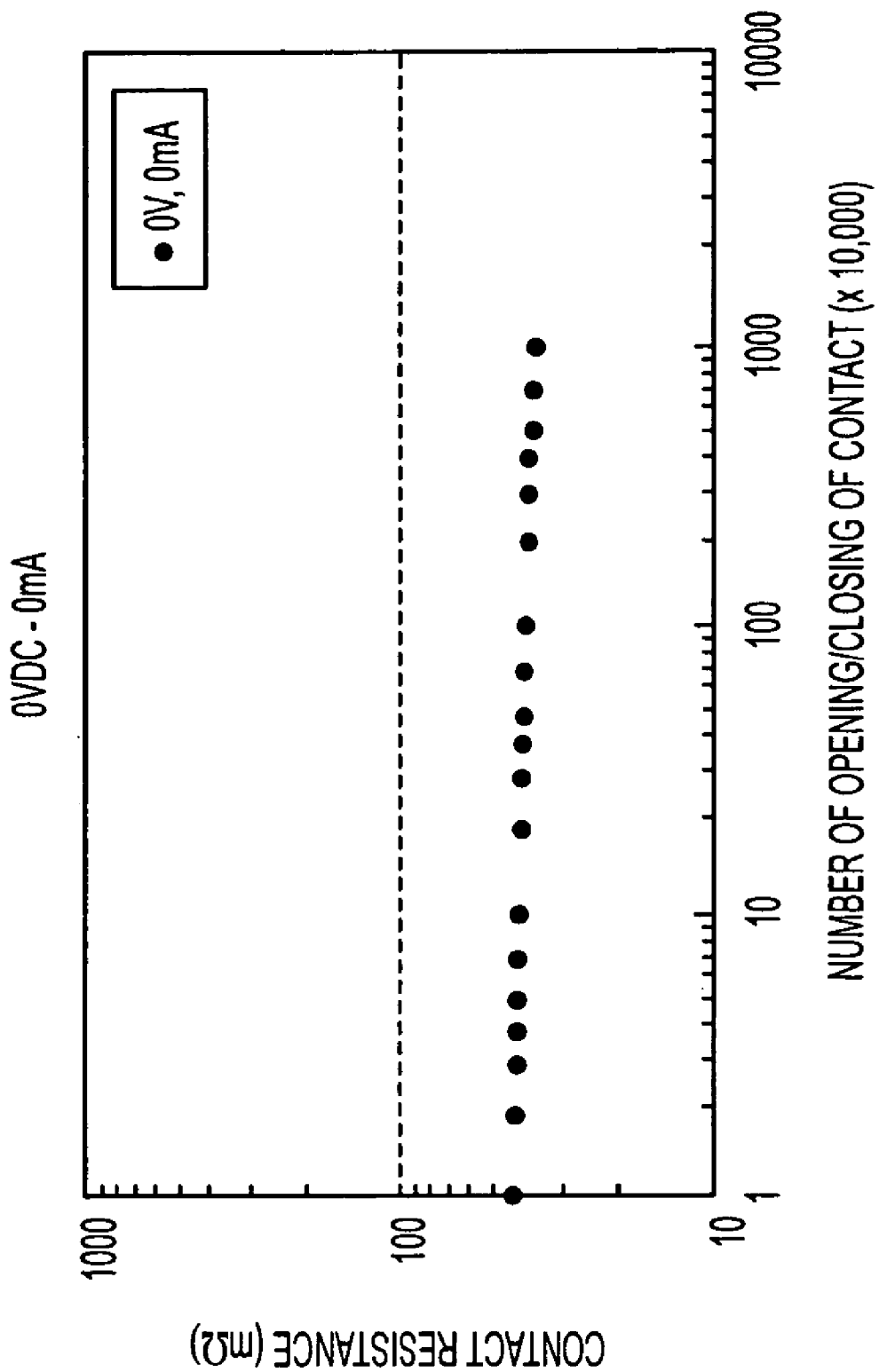
FIG. 12 is a graph illustrating the results of the measurements of the mechanical life characteristics of an electromagnetic relay according to the present invention under a load of 0V–0 mA.

The results of the measurement of mechanical contact life characteristics are set forth in FIG. 9 for the load condition (1), FIG. 10 for the load condition (2), FIG. 11 for the load condition (3), and FIG. 12 for the load condition (4). In FIGS. 9 to 12, the average of contact resistance of 10 samples under the various load conditions was shown. When the contact resistance exceeded 100 mΩ, it was considered that the mechanical contact life had been reached.

As can be seen in the results of the measurement of the mechanical contact life characteristics, the electromagnetic relay of the present invention showed little or no rise in the contact resistance of contacts under any load conditions. Further, the electromagnetic relay of the present invention did not show a contact resistance of more than 100 mΩ, which was threshold, even when the number of opening and closing the contact reached 2.5 millions. It can thus be seen that the electromagnetic relay of the present invention has a very long mechanical contact life.

Further, the inventors evaluated the electrical life of the contact of the closed electromagnetic relay including a structure molded by a thermoplastic resin composition of the present invention as shown in FIG. 1 in the presence of (5) 1,4-butanediol, (6) polyethylene glycol and (7) 1,5-pentanedill by measuring the contact resistance (CR) of the contact in terms of the function of the number of opening and closing the contact. The contact to be measured was an Au—Ag system.

Figure 13:
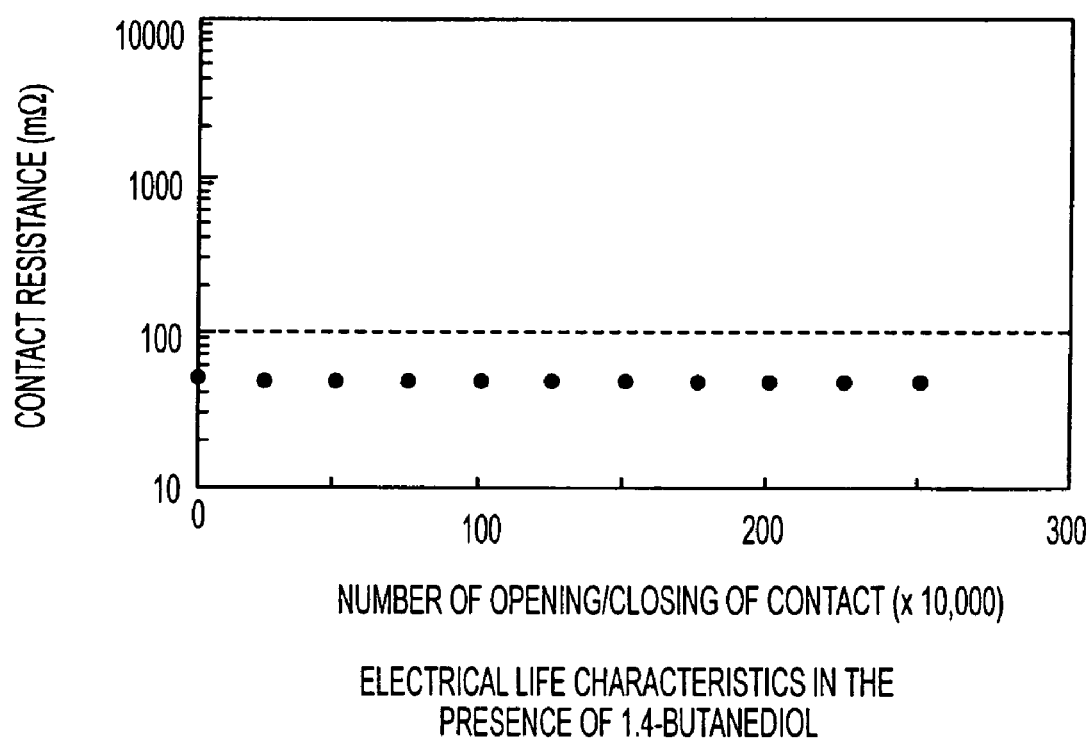
FIG. 13 is a graph illustrating the results of the measurements of the electrical life characteristics of the contact in a closed electromagnetic relay according to the present invention in the presence of 1,4-butanediol.
Figure 14:
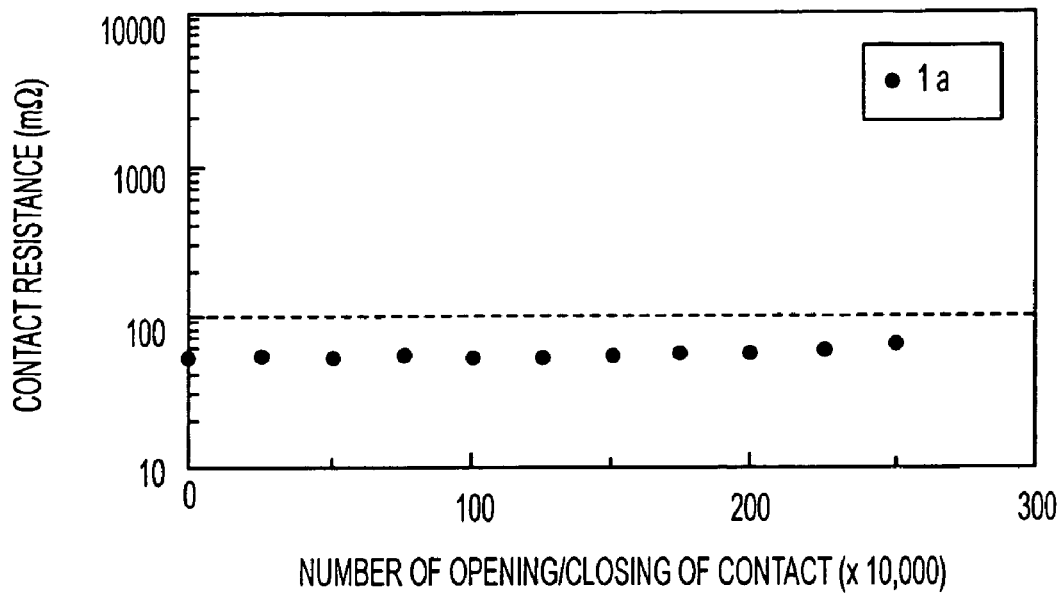
FIG. 14 is a graph illustrating the results of the measurements of the electrical life characteristics of the contact in a closed electromagnetic relay according to the present invention in the presence of polyethylene glycol.
Figure 15:
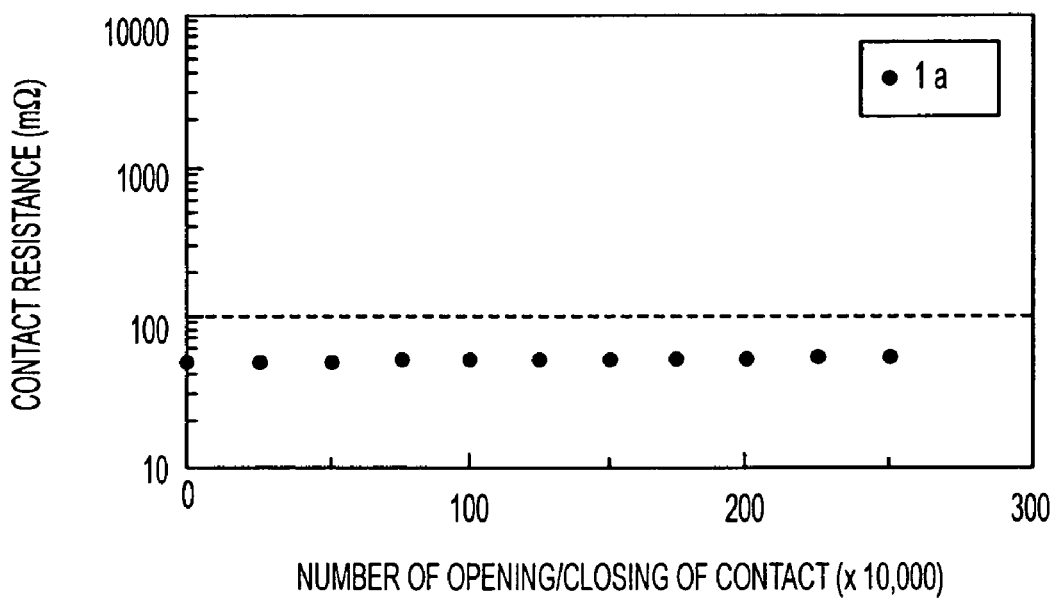
FIG. 15 is a graph illustrating the results of the measurements of the electrical life characteristics of the contact in a closed electromagnetic relay according to the present invention in the presence of 1,5-pentanediol.

The results of the measurement of electrical contact life characteristics are set forth in FIG. 13 for the condition (5), FIG. 14 for the condition (6), and FIG. 14 for the condition (7). It can be seen that the electromagnetic relay of the present invention did not show a contact resistance of 100 mΩ, which was threshold, even when the number of opening and closing the contact reached 2.5 millions in the presence of any of 1,4-butanediol, polyethylene glycol and 1,5-pentanediol. In particular, in the presence of 1,4-butanediol, even when the number of opening and closing the contact exceeded 3 millions, the electromagnetic relay of the present invention did not show a contact resistance of more than 100 mΩ, which was threshold. It can thus be seen that the electromagnetic relay of the present invention exhibits a long electrical contact life.

Further, the inventors measured five samples of the closed electromagnetic relay of FIG. 1 including a structure molded by the thermoplastic resin composition of Example 1, Comparative Example 3 and Comparative Example 4 for the number of occurrence of sticking at various contacts. As a result, data shown in FIG. 16 were obtained. Numerals 1$a$, 2$a$, 1$b$, and 2$b$ in FIG. 16 are contact 1$a$, contact 2$a$, contact 1$b$, and contact 2$b$ where $a$ represents a normally open contact, and $b$ represents a normally closed contact.

The measurement of sticking was accomplished by measuring the relay in a 50° C. atmosphere for the number of occurrence of sticking under a 96V–140 mA load by the time when the number of opening and closing the contact at a frequency of 3 Hz reached 2 millions. When the opening and closing of the contact was delayed by 20 msec or more, it was considered sticking.

As can be seen in the data of sticking shown in FIG. 16, the closed electromagnetic relay including a structure molded by the thermoplastic resin composition of Example 1 showed no sticking at any of the contacts 1$a$ to 2$b$ by 2 million operation cycles and thus showed an acceptance of 20/20, i.e., percent acceptance of 100%. On the contrary, Comparative Example 3 showed 99 or more sticking and thus showed an acceptance of 0/20, i.e., percent acceptance of 0%. Comparative Example 4 showed from 0 to 99 sticking and thus showed an acceptance of 1/20, i.e., percent acceptance of 0.05%. It can thus be seen that the electromagnetic relay of the present invention is insusceptible to contact failure as well as sticking. The sticking measuring apparatus used herein can measure the number of occurrence of sticking only up to 99. The figure "99" in FIG. 16 is meant to indicate 99 or more.

The present invention has been described with reference to a thermoplastic resin composition kneaded with a polyol. However, similar results can be obtained with a pelletized thermoplastic resin coated with a polyol in a predetermined weight proportion.

What is claimed is:

1. A thermoplastic resin composition for an electrical/electronic contact part comprising:
   polybutylene terephthalate as a thermoplastic resin;
   a halogenated aromatic compound which is contained in a range of 1 to 50 parts by weight based on 100 parts by weight of said thermoplastic resin; and
   $(Na_2O)_{1.0}Sb_2O_5$ as a double salt;
   wherein said double salt is contained in a range of 0.5 to 40 parts by weight based on 100 parts by weight of said thermoplastic resin.

2. A thermoplastic resin composition according to claim 1, further comprising a polyol.

3. A thermoplastic resin composition according to claim 1, wherein said halogenated aromatic compound is contained in a range of 10 to 30 parts by weight based on 100 parts by weight of said thermoplastic resin.

4. A thermoplastic resin composition according to claim 1, wherein said double salt is contained in a range of 1 to 20 parts by weight based on 100 parts by weight of said thermoplastic resin.

5. A thermoplastic resin composition according to claim 1, wherein said polybutylene terephthalate resin has an intrinsic viscosity of from 0.7 to 1.4 dl/g, preferably from 0.7 to 1.1 dl/g.

6. A thermoplastic resin composition according to claim 1, wherein said thermoplastic resin is selected from the group consisting of polyamide, polycarbonate, liquid crystal polyester, polyacetal, and polyphenylene sulfide.

7. A thermoplastic resin composition according to claim 1, wherein a halogen content in said resin composition comprising a halogenated aromatic compound is from 2 to 15% by weight.

8. A thermoplastic resin composition for an electrical/electronic contact part comprising:
   a thermoplastic resin;
   a halogenated aromatic compound which is contained in a range of 1 to 50 parts by weight based on 100 parts by weight of said thermoplastic resin;
   a double salt selected from the group consisting of $(X_2O)_nSb_2O_5$ and $(YO)_nSb_2O_5$, where X represents a monovalent alkaline metal element, and Y represents a divalent alkaline earth metal element, and n represents a ratio of X2O or YO to Sb2O5 exceeding 0.7, said double salt having an adsorbed water elimination rate of not more than 50 mm. as calculated in terms of titration time;
   wherein said double salt is contained in a range of 0.5 to 40 parts by weight based on 100 parts by weight of said thermoplastic resin; and
   polyalkylene glycol.

* * * * *